United States Patent [19]
Otte, Jr.

[11] 3,965,006
[45] June 22, 1976

[54] LIQUID WASTE DISPOSAL
[75] Inventor: George Otte, Jr., Erie, Pa.
[73] Assignee: American Sterilizer Company, Erie, Pa.
[22] Filed: Nov. 12, 1974
[21] Appl. No.: 523,045

[52] U.S. Cl.............................. 210/138; 210/148; 210/152; 210/205; 4/92
[51] Int. Cl.²......................................... C02B 1/40
[58] Field of Search .......... 210/104, 105, 138, 148, 210/152, 205; 4/89, 92, 10

[56] References Cited
UNITED STATES PATENTS

| | | | |
|---|---|---|---|
| 2,858,939 | 11/1958 | Corliss ............................ | 210/152 X |
| 3,327,855 | 6/1967 | Watson et al. .................... | 210/152 X |
| 3,856,672 | 12/1974 | Boswinkle et al. ............... | 210/152 X |
| 3,883,432 | 5/1975 | Hildebrand ....................... | 210/152 |

*Primary Examiner*—John Adee

[57] ABSTRACT

A liquid waste disposal unit for use in a hospital to handle potentially contaminated waste materials or the like is disclosed. The disposal unit has a funnel shaped wet bottom chamber connected to a trap section. A rinse means for a container extends up inside it and a vent is provided for removing airborne odors, aerosols, fumes and air. The chamber may be connected to a grinder located between the chamber and a trap. The trap may discharge into a centralized treatment tank. An unobstructed connection is provided between the chamber and the trap and an integral outlet fitting is connected to the chamber between the trap and the chamber for connecting to a building waste line. A foot lever controlled door is hinged to the top of the chamber. A "spin" type nozzle and a flushing mechanism are interconnected with the door and provides a gentle flush when the door is opened. Rim nozzles are arranged so that water encircles the inside of the bowl in a spiral path toward the bottom. The air enters the chamber as the liquid waste is poured into the chamber and is withdrawn with negative pressure by venturi action created by the water entering the chamber. A vertical pipe with a "T" bar and with an aerator-type nozzle is supported in the chamber for rinsing the liquid waste from a container, such a container may be supported on the neck of the vertical pipe, resting on the "T" bar fixed to the pipe. Means is provided for automatically increasing the volume of water for stronger flushing action when the door is closed for a specific time. A short time after the start of flush, the water actuates a spin-type nozzle in the door which ejects hot water and chemicals to clean the chamber and door interior for a time cycle valve means control.

19 Claims, 6 Drawing Figures

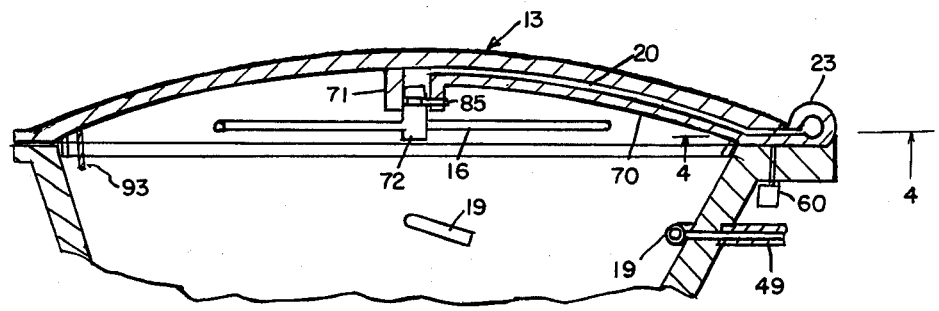
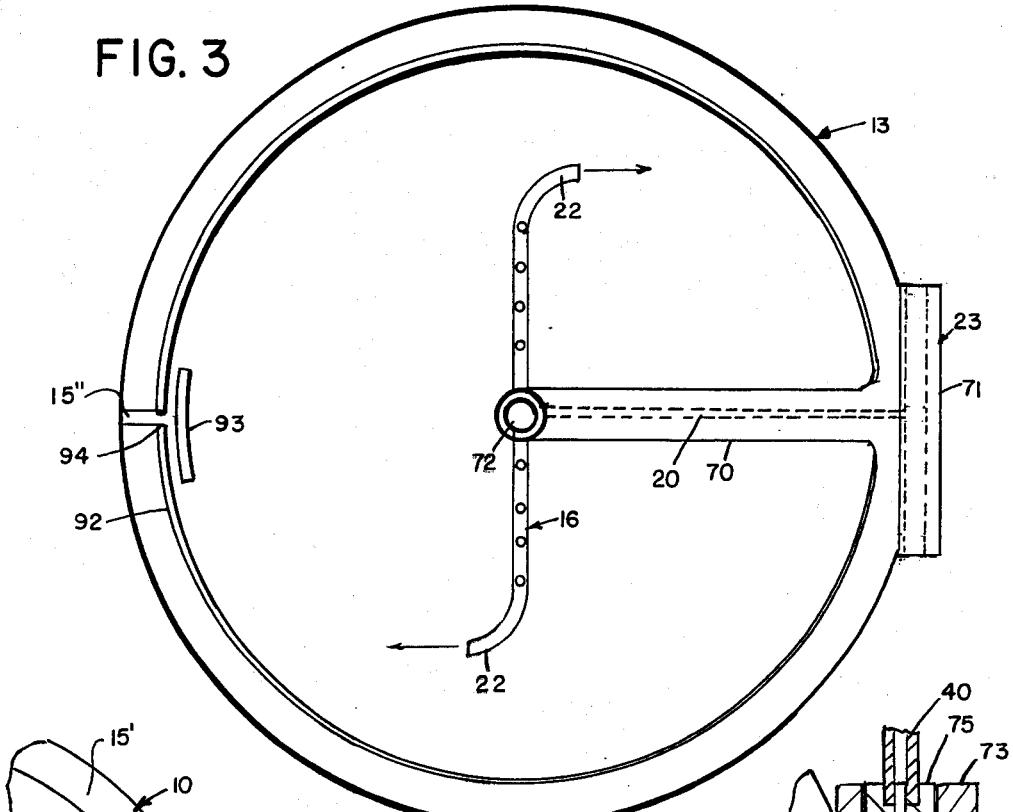
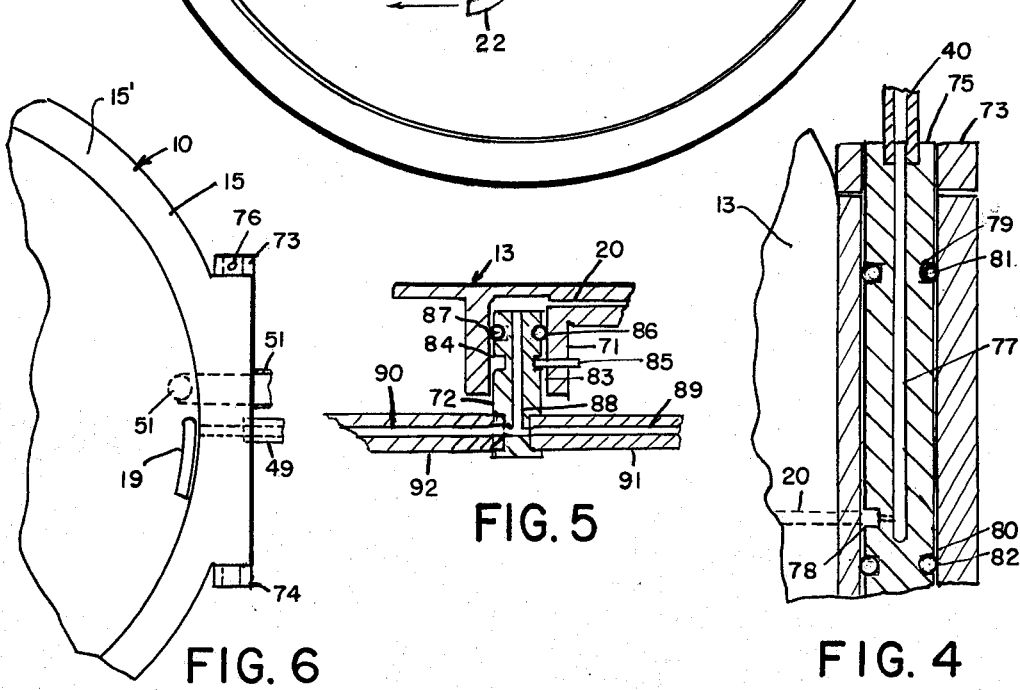

LIQUID WASTE DISPOSAL

REFERENCE TO PRIOR ART

The present invention constitutes an improvement over the prior art shown in such patents as the following U.S. Pat. Nos.:

| Patent No. | | |
|---|---|---|
| | 183,716 | Smith |
| | 253,153 | Bostel |
| | 261,818 | Phillips |
| | 346,997 | Hunter |
| | 438,981 | Baxter |
| | 507,273 | Jukes |
| | 925,587 | Mitchell |
| | 987,112 | Connelly |
| | 1,590,298 | Landis |
| | 1,005,075 | Rosenstock |
| | 2,024,952 | Snyder et al |
| | 2,283,678 | Landis |
| | 3,411,162 | Palmer |

GENERAL STATEMENT OF INVENTION

This invention relates to a means of disposing of liquid and/or semi-liquid waste in a hospital, and more particularly, to an improved means of handling and disposing of potentially contaminated liquid or semi-liquid waste materials.

While sinks of various types, wash bowls, water closets, toilets, bedpan, urinal and other utensil cleaner-sanitizers, and the like have long been known and utilized, the invention herein described utilizes a new concept designed to improve environmental asepsis by reducing, if not completely eliminating, the potential hazards heretofore associated with the handling and disposing of liquids, especially contaminated or potentially contaminated liquids, in hospitals. Liquid waste normally generated in the surgical suite, obstetrical suite, emergency room, intensive care unit, patient room, laboratory, and other hospital areas often contains disease-producing organisms and/or matter. This liquid waste includes water from floor cleaning procedures wherein bacteria have been carried from one part of the hospital to another on the shoes of personnel.

Pouring the liquid into a contemporary dry- or wet-bottom sink, or the like, can result in splashing, aerosols, coating or filming (on the sides and/or bottom of the sink), soil deposits (on the sides and/or bottom of the sink, as well as the surrounding area up to several feet from the sink), inadvertant spillage, and other hazardous conditions. These conditions or circumstances increase contamination levels on, in and around the sink, as well as in the surrounding environment.

The invention disclosed herein includes the following features:

1. Eliminates splashing as the liquid flows from the container to the disposal.
2. Precludes the release of aerosols which may occur as the liquid flows from the container to the disposal.
3. Provides means to rinse the container from which the liquid has been poured into the disposal.
4. Removes airborne odors, aerosols, fumes, etc.
5. Protects personnel by lessening the possibility of spillage (contact) during the action of disposal.
6. Provides self-cleaning action (to the disposal).
7. Provides self-sanitizing action (to the disposal).

OBJECTS OF THE INVENTION

It is an object of the invention to provide an improved liquid waste disposal unit.

Another object of the invention is to provide an improved liquid waste disposal unit for use in disposing of potentially contaminated liquid waste materials.

Another object of the invention is to provide a disposal unit for potentially contaminated liquid waste materials that is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 2 is a sect. view of the unit shown in FIG. 1.

FIG. 3 is a bottom view of the cover.

FIG. 4 is a cross-sectional view taken on line 4—4 of FIG. 2.

FIG. 5 is a partial enlarged cross-sectional view of a part of FIG. 2.

FIG. 6 is a partial top view of the chamber.

DETAILED DESCRIPTION OF DRAWINGS

Figure 1:
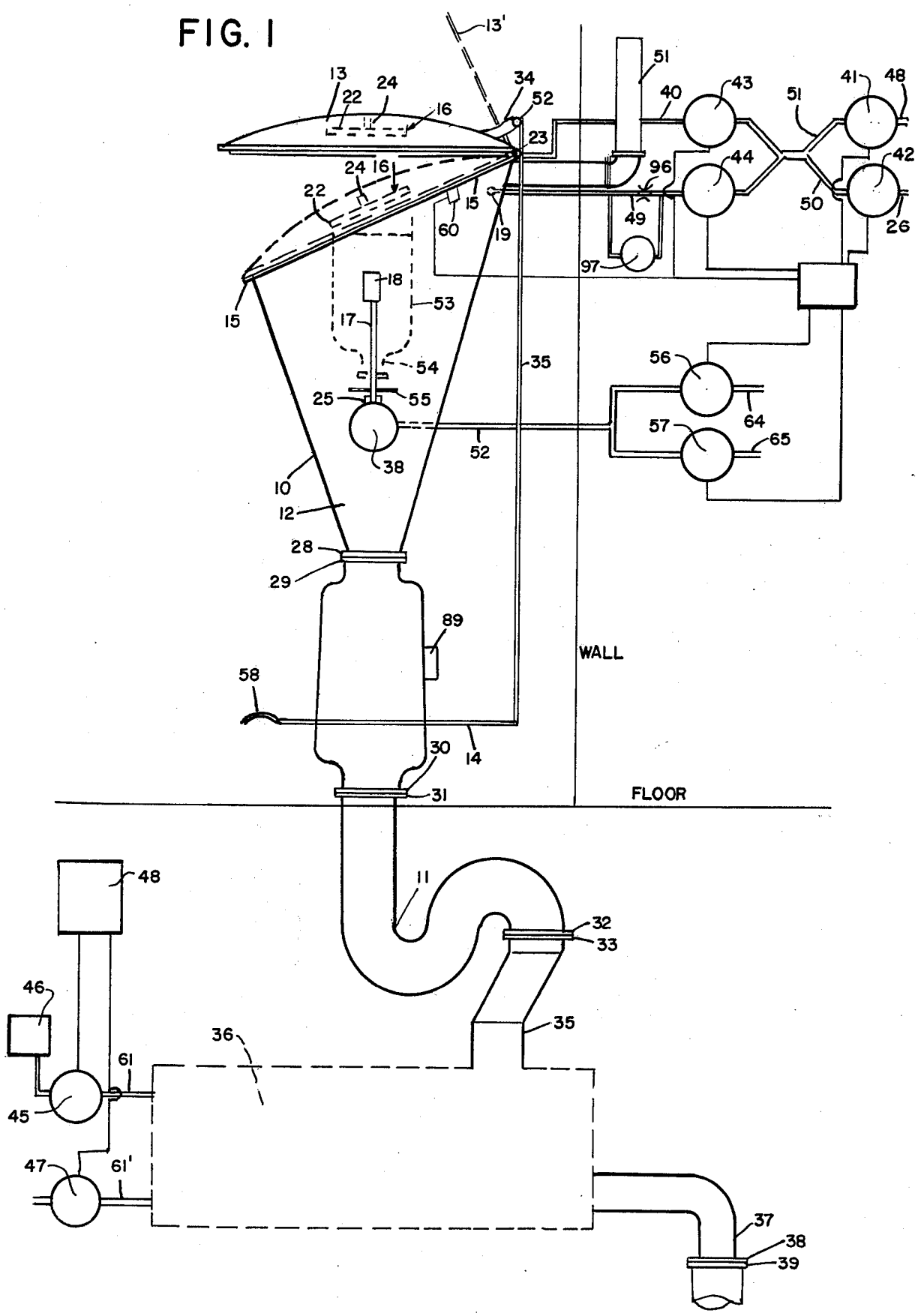
FIG. 1 shows a schematic side view of the disposal unit according to the invention.

Now with more particluar reference to the drawings the liquid waste disposal unit disclosed herein is especially suited for use in hospitals and the like to handle potentially contaminated waste material.

CHAMBER AND WASTE GRINDER

The waste disposal unit according to the invention is primarily a wet bottom chamber with a door trap and an associated structure. The funnel shaped chamber 10 has an integral open bottom fitting 12 surrounded by an integral flange 28 which is shown connected to the flange 29 of the waste grinder 27. The chamber may be made of cast iron or steel plastic or other suitable material finished inside and outside such that it will not retain soil. The flange 30 of the waste grinder is shown connected to the flange 31 of the trap 11 and the flange 32 of the trap 11 is shown connected to the flange 33 of the line 35 which connects to treatment tank unit 36. The discharge pipe 37 of the waste disposal unit has a flange 31 connected to the flange 30 of the waste line.

The flange 28 of the fitting 12 could obviously be connected directly to the flange 31 of the trap 11 and the flange 32 of the trap 11 could be connected directly to the flange 39 of the drain line. The chamber may be floor mounted as shown, or wall mounted as desired.

COVER

The cover 13 is hinged to chamber 10 and carries arm 16, cover 13 is generally in the form of a circular disc which may be made of cast material, molded material or other suitable material. The cover 13 has a concave lower surface and a convex upper surface. The lower surface is bounded by a relatively flat circular rim which rests on the rim 15 of the chamber. An integrally attached downwardly extending flange 92 extends downwardly at right angles to the flat surface 15 and prevents water from passing through the space between the cover and the rim 15 of the container. A groove 15 extends from the outer edge of the cover through the surface 15 to admit air to the inside of the chamber and this air is exhausted through the vent 51. A baffle 93 is integrally fixed to the cover 13 and spaced inwardly from the flange 92. The baffle 93 overlies groove 94 and prevents water from being driven from spin nozzles 22 through slot 15'' and through the groove 94 from the spinning nozzle 22, yet it allows air to enter through slot 15''. The cover has a hollow boss 71 integral with its rear edge which is received between the two space bosses 73 and 74 which are integrally attached to the rear edge of the rim of the chamber.

THE COVER HINGE

The boss 71 and the spaced bosses 73 and 74 each have a bore therein that are all in line with each other and these bores through the bosses receive a pin 75. The pin 75 is held against rotation by a setscrew 76 in the boss 73.

The cover 13 is connected to the chamber by the pin 75 which has an axially extending bore 77 that extends from the end having the line 40 connected to it to a point just past the hole 78. The radially extending hole 78 communicates with the inside of the axially extending bore 77 and connects fluid from lines 40 through the bore 77 and through the radially extending hole 78 to the opening of passage 20 when the cover is in closed position. When the cover is in open position, the opening to passage 20 is rotated around the pin 75 bringing the opening to passage 20 out of alignment with hole 78 and therefore reducing the flow of water from the line 40 to the passage 20 and to arm 16. The arm 16 is supported on the cover 13 by shaft 72 and pin 85. Shaft 75 has peripherally extending "O"-ring grooves 79 and 80 formed in its periphery and these grooves each receive an "O"-ring 81 and 82 respectively. These "O"-rings provide seal to prevent the leakage of water around the ends of the pin 75. The boss 71 has a central bore 83 that extends parallel to the axis of the cover. The bore 83 receives the shaft 72. The shaft 72 has a circumferential groove 84 which receives the inner end of pin 85 thus the shaft 72 is free to rotate in the hollow bore 83 of the boss. An "O"-ring 86 is disposed in a circumferential groove 87 in the upper end of the shaft 72 and this "O"-ring forms a seal preventing leakage around the shaft 72. The passage 20 communicates with the bore 83 above the shaft 72 and directs water through bore 88 in the shaft 72 which communicates with the openings 89 and 90 in the curved pipes 91 and 92 respectively thus the water flowing from openings 89 and 90 is discharged through the nozzles 22, a jet action in the direction of the arrows shown to rotate the nozzles.

Various types of nozzles can be provided in the spin-type nozzles to the desired distribution of water.

THE CONTROL CIRCUIT

A pressure switch 60 can be supported on the rim 15 which can be connected to the control 21 and will be actuated when the cover 13 is closed thereby opening valve 43 shutting off the flow of water through valve 43 thereby preventing water from being discharged from nozzles 22 or spray hinges inside the chamber. An orifice 96 is disposed in line 49 and the valve 97 by-passes the orifice 96. Thus when the cover 13 is closed, water of the valve 97 is open by switch 60 allowing water to flow through valve 97 and through pipe 49 at a high rate. When the cover 13 is open, the valve 97 is closed thereby confining the flow of water through the nozzle 19 to a low rate of flow.

The control circuit controls a flow of two or more fluids, for example, water and steam to the arm 16. It likewise controls flow to the rim nozzle 19, and to the vertical pipe 17. The flow of hot water, or chemicals, is likewise controlled to the treatment tank 36 by the program controller 48 which controls the valves 45 and 47. The chemical material may be introduced to valve 45 through line 61 from the dispenser 46 which may be introduced to valve 45 through line 61 from the dispenser 46 which may be of a type familiar to those skilled in the art.

Line 40 is connected through hinge pin 77 through shaft 72 and arm 16 to the spin nozzles 22. Line 49 is connected to the rim nozzles 19 by way of valve 44. The program control 21 which may be a type familiar to those skilled in the art, controls valves 41 and 42 to determine which of the liquids connected to the line 26 and the line 48'. The liquid from valve 41 or valve 42 will be connected to the valve 43 and 44. The controller 21 also controls valve 43 and 44 to determine whether the liquid connected to lines 51 and 50 are connected to the rim nozzles or the spin nozzles. The controller 21 likewise controls 56 and 57 to determine whether the liquid connected to the line 64 or that connected to the line 65 is connected to the valve 38 which will allow the liquid to be discharged through the nozzle 18 when a container rests on the "T" bar 55. The switch 60 is actuated when the cover 13 is closed which operates the controller to operate valve 97 by-passing the orifice 94 when the cover is closed and thereby increasing the flow. An orifice could be placed in line 40 to control the rate of flow to the spin nozzle when the cover is open.

The control 21 and the control 48 may be of a type familiar to those skilled in the art and can be set to program the time that liquid will flow from the various nozzles 22, 18 and 19 and to the tank 36. A suitable electrical outlet box is provided at 89 to control the motor of grinder 27. Valves 45 and 47 may be connected to a chemical liquid from source 46 to pipe 61 which is connected to treatment tank 36. Valve 47 will ordinarily be connected to a source of steam or hot water which will be connected to the tank 36 through the line 61'. The particular chemical will be determined by the type of a contamination that is expected to be discharged into the tank 36. The contamination could be water and liquids from floor cleaning operations which could contain any of the contamination that is found anywhere in the hospital and carried on the shoes of the personnel from one part of the hospital to another.

The foregoing specification sets forth the invention in its preferred practical forms, but the structure shown is capable of modification within a range of equivalents without departing from the invention which is to be understood is broadly novel as is commensurate with the appended claims.

The embodiments of the invention in which an exclusive property or privilege is claimed are defined as follows:

1. An improved disposal unit for disposing of contaminated or potentially contaminated liquid or semi-liquid waste in manner designed to protect personnel and the environment from contamination comprising a conical open top chamber terminating at its lower end in an integral fitting, means on said fitting adapted to connect set fitting to a trap, vent means connected to the upper part of said chamber, a cover, hinge means connecting said cover to said chamber, nozzle means, shaft means supporting said nozzle means on the lower side of said cover, and said shaft means comprising, a shaft rotatably supported on said cover at the center of the inside thereof and extending downwardly therefrom, a hollow arm supported on said shaft and disposed generally perpendicular thereto, holes in said arms, the ends of said arms having said nozzles supported thereon, said nozzle means being supported on the end of said hollow arms whereby said nozzles rotate said arms, and valve means connected to said hinge means and to said nozzle means for connecting fluid to said nozzle means and fluid supply means connected to said valve means whereby the inside of said chamber is sprayed by liquid from said nozzle means, a shaft rotatably supported on said cover at the center of the inside thereof and extending downwardly therefrom, a hollow arm supported on said shaft and disposed generally perpendicular thereto, holes in said arms, the ends of said arms having said nozzles supported thereon, said nozzle means being supported on the end of said hollow arms whereby said nozzles rotate said arms.

2. The disposal unit recited in claim 1 wherein linkage means is connected to said cover, and means on said linkage means adapted to be engaged by foot or forearm of an operator whereby the operator while opening said cover has full use of his hands for carrying containers of liquid for disposal.

3. The disposal unit recited in claim 1 wherein a vertical pipe is supported in said chamber, and a second nozzle means is supported on said vertical pipe, and second fluid supply means is connected to said vertical pipe.

4. The disposal unit recited in claim 3 wherein auxiliarly manual control means is connected to said valve means whereby said valve means can be actuated in the event of power failure whereby said automatic control means would be rendered inoperative.

5. The disposal unit recited in claim 1 wherein means is provided for controlling the flow of water to said nozzle means in said cover at a first rate when said chamber door is open and at a second rate when said chamber door is closed whereby the flow of trained gases, vapors, odors and aerosols is implemented through said vent pipe.

6. The disposal unit recited in claim 5 wherein rim nozzles are attached to said chamber on the inside of the rim thereof, and fluid flow means is connected to said rim nozzles whereby said fluid flows through said rim nozzles at a first rate when said cover is open and fluid flows through said rim nozzles at a second rate when said cover is closed.

7. The disposal unit recited in claim 1 wherein said nozzles on said cover are spin type nozzles supported on the first end of a pipe and the second end of said pipe is supported on bearing means on said cover, said pipe extending generally in a radial direction of said cover and means connect said bearings to said valve meams connected to said hinge means.

8. The disposal unit recited in claim 1 wherein second valve means is connected to said vertical pipe and actuating on said valve means actuable by the weight of an object supported on said vertical pipe.

9. The disposal unit recited in claim 1 wherein rim nozzles are supported on the inside of said chamber adjacent said rims and through a means for connecting steam or water to said rim nozzles as provided, said rim nozzles being directed downwardly and tagentially to said chamber whereby said steam or water is directed in a spiral path in said chamber.

10. The disposal unit recited in claim 3 wherein said vertical pipe has a "T" bar supported thereon and said vertical rod is supported on axially means of a valve for turning on water to said vertical pipe when a downward force is exerted on said vertical rod.

11. The disposal unit recited in claim 1 wherein said chamber open top has a rim extending around it and said rim extends downward and forwardly at an angle at approximately 30°.

12. The disposal unit recited in claim 1 wherein valve means is supported on said chamber, said valve means having actuating means engagable by said cover when cover is in closed position whereby the flow of fluid through said nozzles is increased.

13. In combination, a disposal system for treating contaminated liquid and contaminated semi-liquid material comprising an open topped chamber having a cover and a discharge opening, a spin type nozzle rotatably supported on the lower side of said cover, said spin type nozzles comprising shaft means on the lower side of said cover, and said shaft means comprising, a shaft rotatably supported on said cover at the center of the inside thereof and extending downwardly therefrom, a hollow arm supported on said shaft and disposed generally perpendicular thereto, holes in said arms, the ends of said arms having said nozzles supported thereon, said nozzle means being supported on the end of said hollow arms whereby said nozzles rotate said arms, valve means connecting a source of fluid to said nozzle, a treatment tank, a grinder, means connecting said chamber to said grinder and for connecting said grinder to said treatment tank, means connecting said treatment tank to a drain and a program control for controlling the flow of liquids to a nozzle means in said chamber and said treatment tank.

14. The combination recited in claim 13 wherein said program control includes a timer for controlling the duration of flow of liquid to said nozzle.

15. The combination recited in claim 14 wherein said nozzle, said liquid means comprises to spin said nozzle relative to said chamber whereby liquid from said nozzle is distributed throughout said chamber.

16. The combination recited in claim 15 wherein a rim nozzle is supported on the inside of said chamber adjacent said open top and directed tangentially to said chamber and downward whereby said liquid is directed in a spiral path in said chamber.

17. The combination recited in claim 16 wherein said chamber is generally frusto-conical in shape.

18. The combination recited in claim 17 wherein said program control has means for controlling the flow of a disinfectant liquid to said chamber wherein the particular type of contamination is treated by a suitable disinfectant.

19. The combination recited in claim 18 wherein a vertical pipe is supported in said chamber and extends axially thereof, spring means urging said vertical pipe upward, and valve means connected to a source of liquid and operable by said vertical pipe when said vertical pipe is urged downward by a weight on said vertical pipe.

* * * * *